Jan. 9, 1951 W. C. STONE 2,537,487
ADJUSTABLE EXHAUST FOR JET PROPELLED AIRCRAFT
Filed March 1, 1946 2 Sheets-Sheet 1
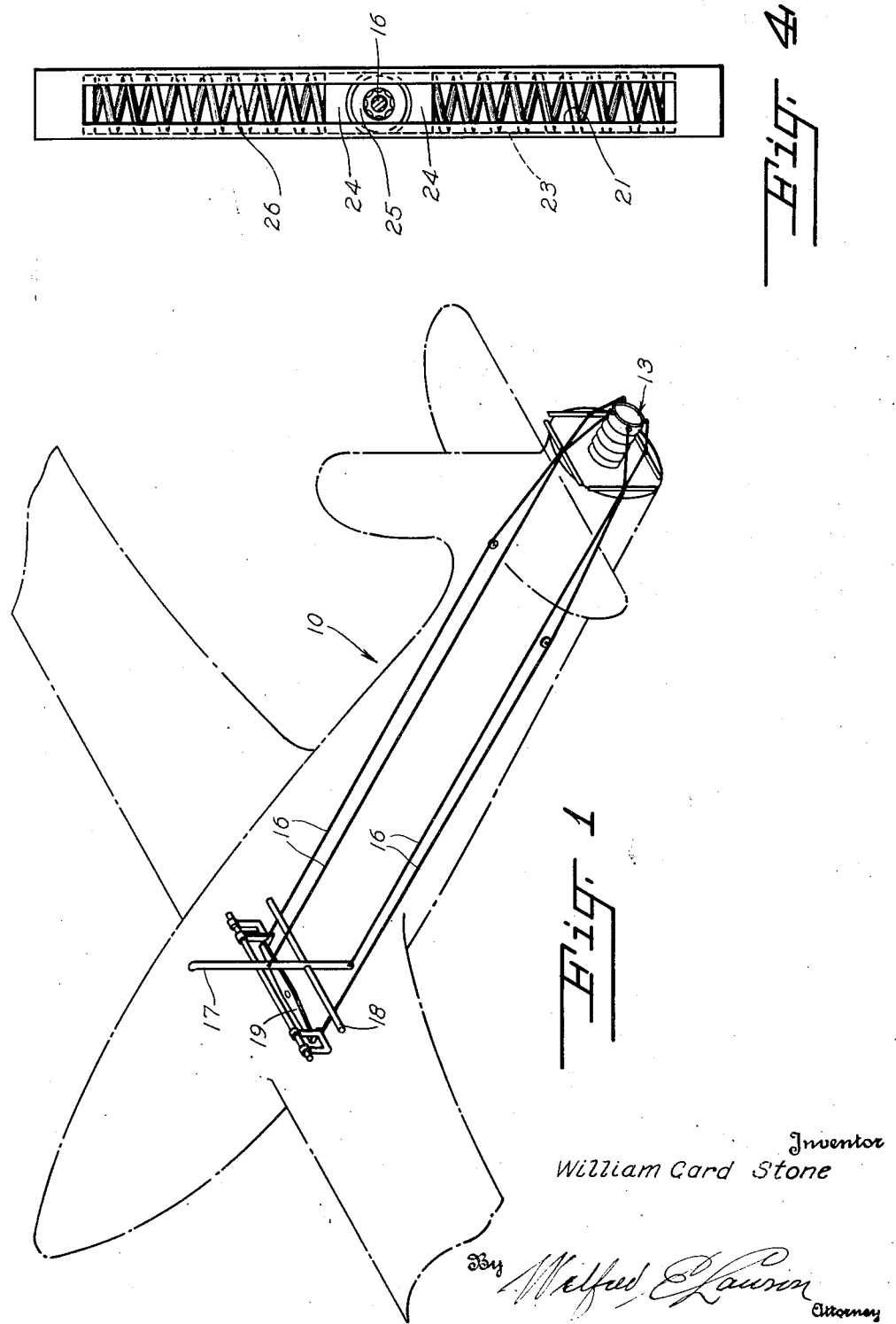
Inventor
William Card Stone Jan. 9, 1951 W. C. STONE 2,537,487
ADJUSTABLE EXHAUST FOR JET PROPELLED AIRCRAFT
Filed March 1, 1946 2 Sheets-Sheet 2
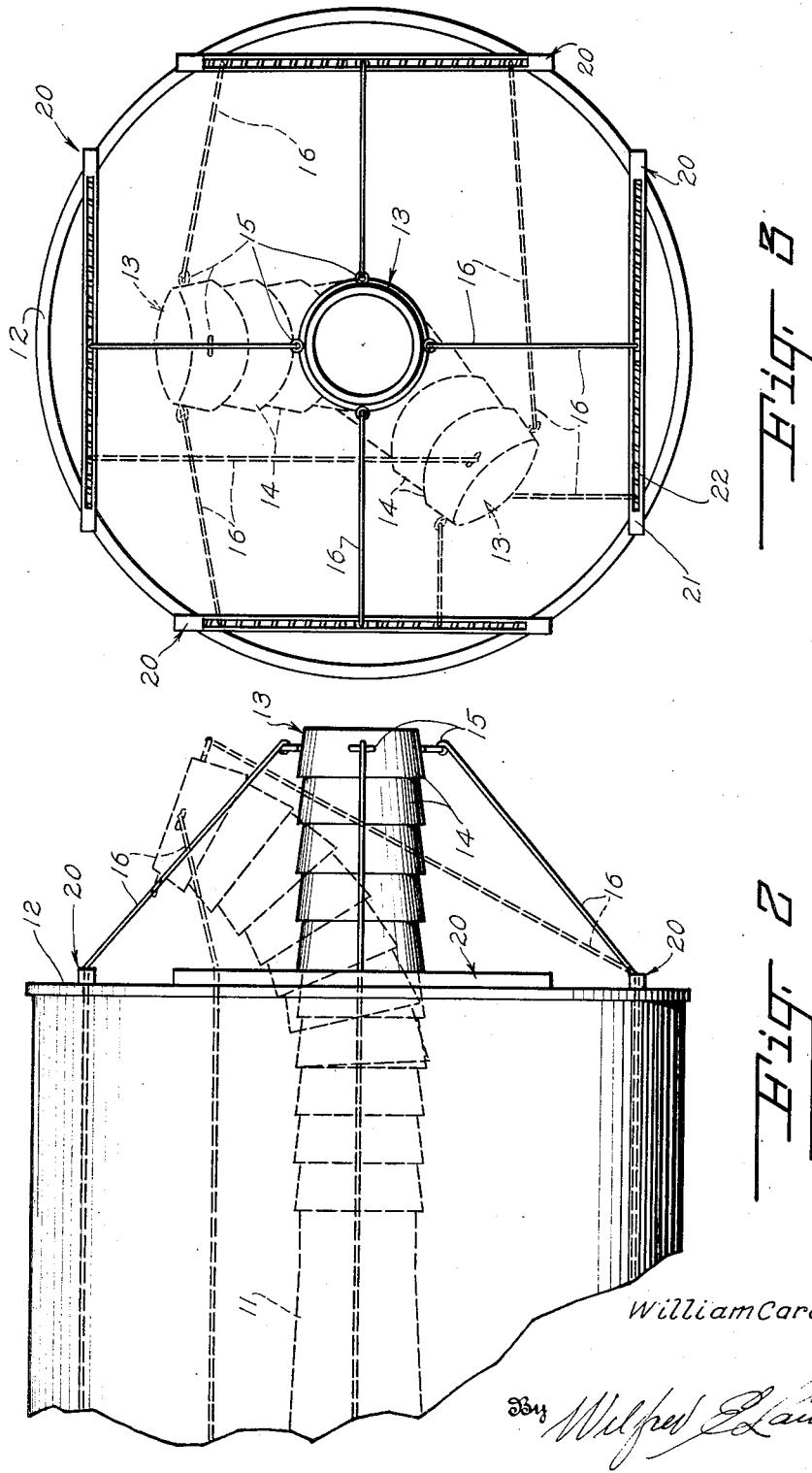
Inventor
WilliamCard Stone Patented Jan. 9, 1951

2,537,487

UNITED STATES PATENT OFFICE 2,537,487

ADJUSTABLE EXHAUST FOR JET-PROPELLED AIRCRAFT

William Card Stone, Springfield, Mo.

Application March 1, 1946, Serial No. 651,111

1 Claim. (Cl. 60—35.55)

This invention relates generally to steering controls for aircraft and pertains particularly to improvements in steering means for jet propelled airships.

As is, of course, well known, the speed of such aircraft as airplanes has been greatly increased by the employment of jet propulsion and the speed of such craft under this method of propulsion is being constantly increased due to refinements in the propelling mechanism and in the designs of the ship.

As the speed of an airplane or airship increases the "slip" or "float" in the making of a turn becomes greater as the speed increases, when standard rudder and elevator mechanisms are employed.

A primary object of the present invention is to provide a novel and improved means of controlling the turning of such craft without side slip, regardless of the speed of the ship, by the employment of the propelling jet to impart the desired lateral thrust to the tail of the craft whereby greater flexibility may be had in handling the ship and making possible the elimination of the conventional rudder and elevator with the resultant elimination of surfaces which increase drag on the craft.

Another object of the invention is to provide an improved steering means for jet propelled aircraft by the provision of a movable or variable exhaust whereby the escaping propelling gases will impart angular thrust upon the tail of the craft to turn the latter in the desired direction.

Still another object of the invention is to provide a steering mechanism for a jet propelled aircraft in which a flexible exhaust is provided together with means under the control of the steering mechanism for directing the outlet end of the exhaust pipe at any desired angle to the longitudinal axis of the craft, means being provided also for returning the outlet end of the exhaust pipe to a position coaxial with the longitudinal axis of the craft as the steering controls are relaxed.

The invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claim.

In the drawings:

Figure 1 shows in broken lines a conventional type of airplane in association with which is shown the controllable jet exhaust pipe and actuating mechanism therefor constructed in accordance with the present invention.

Figure 2 is a view in side elevation of the tail end of the aircraft showing the variable position thrust exhaust.

Figure 3 is a view in rear elevation of the craft, showing the present invention.

Figure 4 is a detail view on an enlarged scale of one of the control cable guides.

Referring now more particularly to the drawings the numeral 10 generally designates the fuselage of an airplane, the same being drawn in broken lines.

This figure represents a jet propelled plane through the rear end of which is discharged the propelling gases by way of a suitable pipe 11, indicated in dotted outline in Figure 2.

Since the jet producing engines form no part of the present invention and are of well known construction, the same have not been illustrated and a description of the operation and construction of the same is not believed to be necessary.

In accordance with the present invention the rear or tail end of the fuselage of the plane has mounted thereon in a suitable manner, the wall plate 12 and secured to and extending through the center of this plate is a sectional, flexible exhaust discharge pipe or nozzle which is generally designated 13 and which, as here illustrated, is made up preferably of a plurality of sections 14 suitably coupled together to give desired flexibility to the exhaust pipe.

As shown in Figure 2 the exhaust pipe 13 is joined at its inner end with the jet discharge pipe 11 and a substantial portion of the exhaust pipe extends beyond the rear end plate 12 so that from the plate outwardly to the end of the exhaust pipe, the latter is relatively free to be bent or turned to extend in any desired direction at an angle with respect to the axial or longitudinal center of the airplane fuselage and of the jet discharge pipe 11 which lies on the axial center of the fuselage.

The outer or terminal section 14 of the flexible exhaust pipe carries, at equidistantly spaced points therearound, suitable means 15, here shown as rings or eyes, to facilitate the attachment to the terminal portion of the pipe of the ends of control cables 16. Two of these cables are attached to the terminal section 14 of the exhaust pipe at the top and bottom sides thereof and extend forwardly through the fuselage in a vertical plane while the other two cables are attached at opposite sides of the terminal exhaust pipe section 14 and extend forwardly through the fuselage in a horizontal plane. The cables lying in the vertical plane are connected to a suitable control unit to facilitate the pulling up or pulling down upon the rear end of the exhaust pipe 13 so as to direct the outlet upwardly or downwardly as desired. Any suitable control means may be employed but there is here shown a vertical control stick 17, mounted upon a horizontal pivot or supporting shaft 18 whereby it may be rocked in the vertical plane of the fuselage, it being understood, of course, that one of the vertical plane cables is connected above the pivot 18 and the other one is connected below the pivot to the stick.

The horizontal plane control cables are suitably attached to opposite ends of a foot bar 19 which is supported for oscillation on a vertical pivot so that pull may be applied when desired to either of the two sides of the outlet end of the exhaust pipe 13 to direct such end to either side of the plane structure.

It will be readily recognized that by suitably manipulating the stick 17 and the bar 19 the outlet of the exhaust pipe may not only be directed upwardly and downwardly or to either side but may be actually moved in a circle while being directed along an oblique path with respect to the longitudinal center of the fuselage so that the propelling jet may be exhausted in any desired direction away from the longitudinal axis of the airplane to effect movement of the rear end of the plane in a desired direction away from the line of travel and thereby cause the craft to turn in a direction opposite to that in which the rear end of the same is shifted.

As shown in Figure 2 the cables 16 pass through the tail plate 12 at points spaced a substantial distance radially of the plate from the axial center of the exhaust pipe and consequently the outer ends of the cables from the plate 12 to the pipe 13 extend at an angle toward the axial center of the pipe so that when a pull is applied to any cable the outer end of the exhaust pipe is readily pulled to curve the pipe to the desired angular adjustment with respect to the long axis of the plane.

In order that the cables may be properly centered when the exhaust pipe 13 is extending straight to the rear and at the same time may swing relative to one another so to effect desired movement of the end of the exhaust pipe along lines other than vertically and horizontally, there are provided the four guides, each of which is generally designated 20 and each of which serves one cable.

Each of the guides here shown comprises a longitudinally slotted bar 21, the slot of which is designated 22. These bars are fixed, as shown in Figure 3, across the rear face of the plate 12, the bars being arranged to define a rectangular area and each of the cables 16 extending from the exhaust pipe section 14 directly to the adjacent bar and passing through the slot thereof.

The adjacent or opposing faces of the slot 22 of each of the bars 21 is suitably longitudinally channelled as indicated at 23 to receive the opposite sides of the runner blocks 24. These blocks have positioned between them the annular roller or ball bearing unit 25 through the center of which the cable 16 passes. Thus the cable can move back and forth between the runner blocks with a minimum of friction.

At opposite sides of the pair of runner blocks 24 and the bearing 25, are positioned the expansion springs 26 which are housed in the slot 21 and engage at their opposite sides in the opposing channels 23. These springs, bearing at their outer ends against the adjacent ends of the slot 21 and being of equal tension, maintain the bearing 25 and the cable 16 passing therethrough, midway between the ends of the guide so that such cable is centrally positioned between the adjacent guides and maintained in the same plane as the cable directly opposite. The four cable ends extending from the terminal section 14 of the exhaust pipe 13 thus extend from the end of the exhaust pipe radially outwardly and, when the exhaust pipe is directed straight rearwardly the cables will be positioned 90 degrees apart as shown in Figure 3.

In the operation of the present invention when the cable controls 17 and 19 are actuated the outlet end of the exhaust pipe will be pulled from its position upon the longitudinal center of the airplane so that the pipe will be curved as shown in dotted lines in Figure 2 to discharge obliquely to the long axis of the plane. Actuation of either the stick 17 or the foot lever 19 alone will cause the pipe to move either straight upwardly or straight downwardly or directly to one side or the other in the plane of the pulling cable. However, as will be readily understood, if both of the controls are operated together then the pipe outlet end can be moved to any desired angle with respect to the longitudinal center of the airplane and when it is moved under the action of both controls simultaneously the cable bearings will shift in their respective guides as illustrated in dotted lines in Figure 3 where the exhaust pipe is directed downwardly and laterally with respect to the longitudinal center of the airplane structure. This movement of the cables will place certain of the springs under tension and when the cables are relaxed the bearings for the cables will be moved by the compressed springs back to their former center positions in the guides.

From the foregoing it will be readily seen that by means of the present invention the propulsive force of the jet by which the plane is moved through the air may also be readily utilized to effect the turning of the plane in any desired direction without having to make use of the usual rudders and elevators and since the outlet end of the exhaust pipe can be moved to any desired position in a circle around the longitudinal center of the craft it will be readily apparent that a greater flexibility of control is had of the airplane than is possible by the use of rudders and elevators and at the same time it is believed that the usual side slip of the craft will be eliminated.

I claim:

In a jet propelled craft having an axial rearwardly directed jet discharge pipe, a flexible exhaust pipe coupled with the discharge pipe and adapted to position coaxially therewith and with the longitudinal axis of the craft, control cables operatively supported upon the rear end of the craft and extending therefrom toward the axial center of the craft to the outlet end of the exhaust pipe, means coupling the cables with the outlet end of the exhaust pipe, said cables being equidistantly spaced around the exhaust pipe, means for selectively manipulating said cables to effect the bending of the exhaust pipe for discharge at an angle oblique to the longitudinal axis of the craft, guide elements of elongated slotted form mounted on the rear end of said jet discharge pipe above, below, and at opposite sides of said exhaust pipe and extending transversely of the longitudinal axis of the craft, a runner slidably supported in the slot of each of said guide elements and having a cable passing through the same, and a pair of opposed springs housed within each of said slots, one at each side of the runner therein, to maintain the runner and the cable passing therethrough in the normal positions thereof.

WILLIAM CARD STONE.

REFERENCES CITED

The following references are of record in the file of this patent:

UNITED STATES PATENTS

| Number | Name | Date |
|---|---|---|
| 1,343,850 | Roe | June 15, 1920 |
| 1,642,752 | Landon | Sept. 20, 1927 |
| 1,809,680 | Egan | June 9, 1931 |
| 2,019,073 | Cooper et al. | Oct. 29, 1935 |

FOREIGN PATENTS

| Number | Country | Date |
|---|---|---|
| 432,727 | France | Oct. 11, 1911 |
| 670,241 | France | Aug. 17, 1929 |